3,352,111
ROCKET PROPULSION SYSTEM
Thomas W. Jackson, Atlanta, Ga., assignor to Georgia Tech Research Institute, Atlanta, Ga., a corporation of Georgia
Filed Jan. 28, 1964, Ser. No. 340,607
13 Claims. (Cl. 60—251)

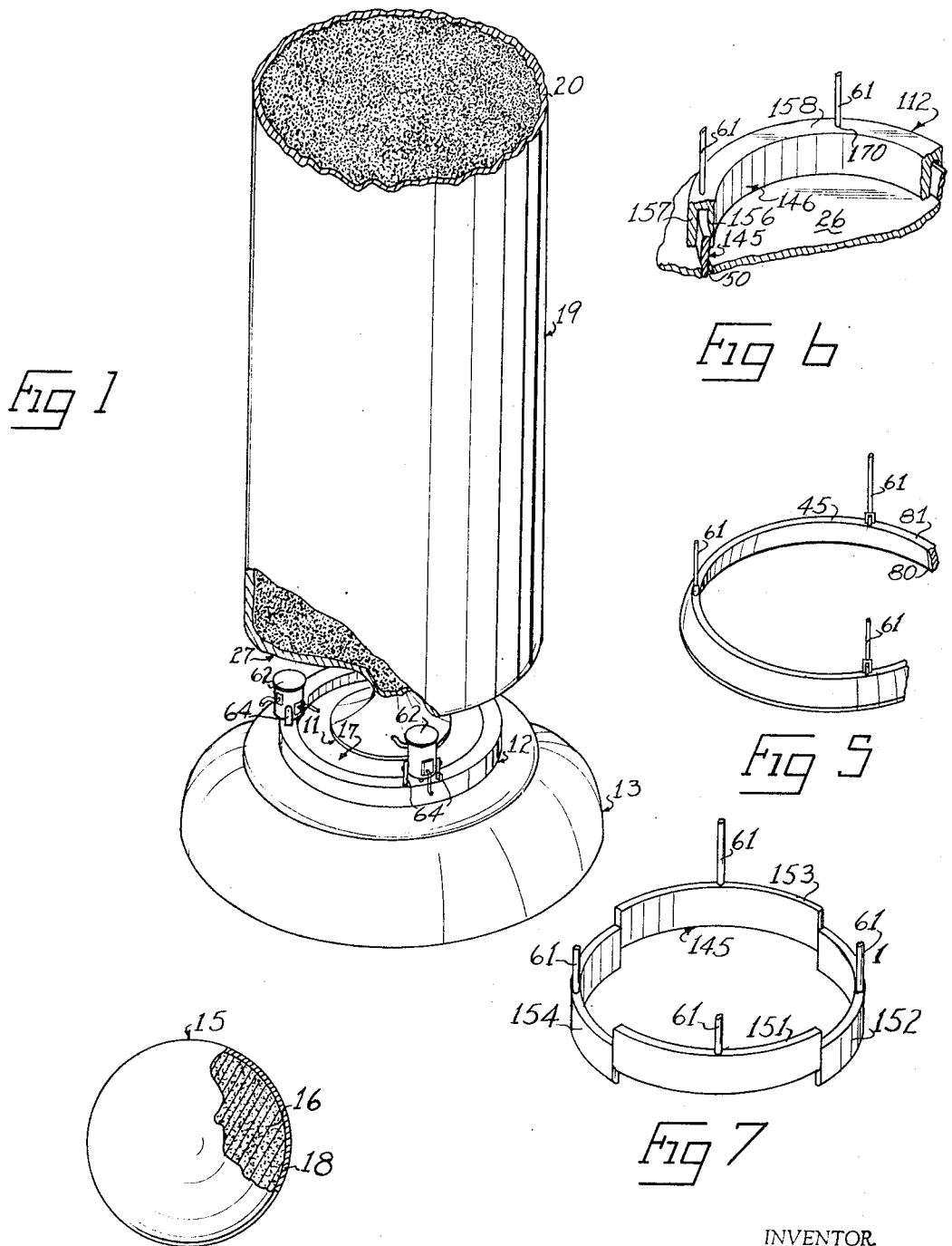

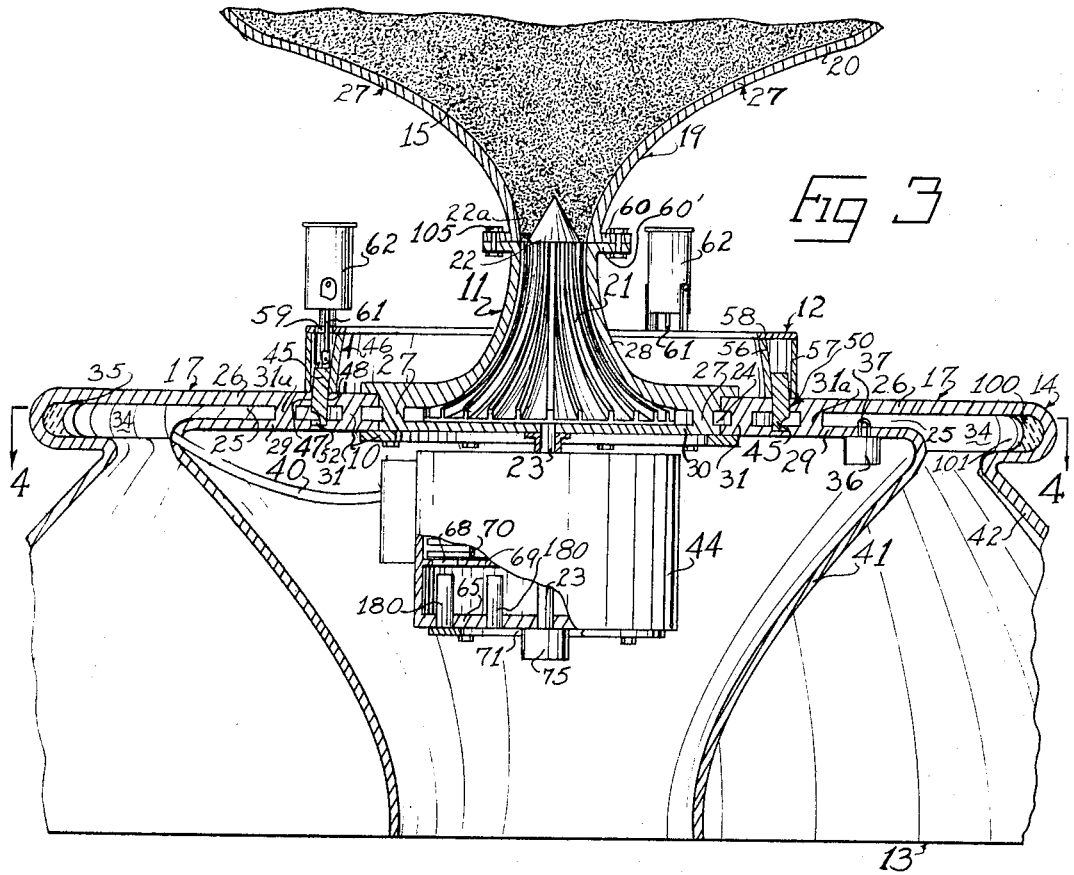
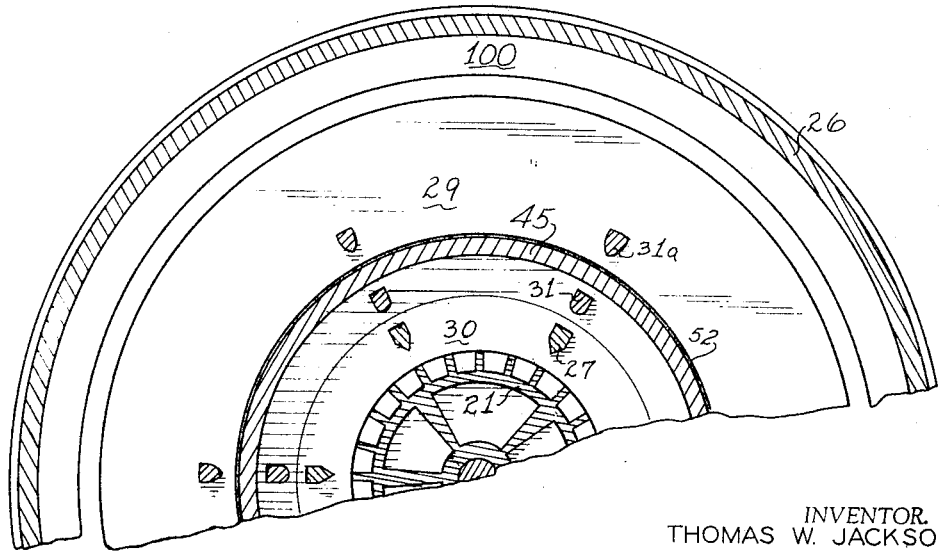

ABSTRACT OF THE DISCLOSURE

A rocket propulsion system having a manifold, combustion chamber, exhaust nozzle, propellant pump, and a propellant comprising a plurality of solid particles wherein each particle is substantially spherical thereby providing the plurality of particles with the capability of being pumped as a liquid in the absence of a carrier fluid. In addition, there is a vane-type valve for selectively controlling the flow of propellant from the manifold to the combustion chamber.

Specification

This invention relates to propulsion systems for rockets and more particularly to a propulsion system for a rocket having the advantageous characteristics of both a solid propellant propulsion system and a liquid propellant propulsion system.

Solid propellant propulsion systems using solid propellant charges are fundamentally simple and may be stored for extended periods of time without deterioration of the solid propellant charges. Very few pieces of equipment are necessary for the operation of a solid propellant propulsion system, and propulsion systems of this type may be fired after installation without time-consuming preparation of the propulsion system immediately prior to firing. However, there are certain inherent disadvantages with solid propellant propulsion systems.

One of these disadvantages is the rigidity of thrust that solid propellant propulsion systems possess. After ignition of the solid propellant charge, the rate of burning of the solid propellant charge is controlled solely by the physical shape of the charge. Thus, needed changes in thrust other than those manufactured into the physical shape of the propellant charge are difficult to make.

Another disadvantage of solid propellant propulsion systems is their rigidity of directional control and directional stability. Since the engines for solid propellant propulsion systems customarily must be integral with the propellant storage chamber, the engines cannot be suspended from a gimbal arrangement for directional control and stability as is done with the engines of liquid propellant propulsion systems. Attempts have been made to overcome this disadvantage by suspending the diverging section of the engine exhaust nozzle from a gimbal arrangement or by placing movable vanes within the engine exhaust nozzle.

The suspending of the diverging section of the engine exhaust nozzle from a gimbal arrangement has been unsatisfactory because motion of the diverging section relative to the converging section of the engine exhaust nozzle causes a loss of engine efficiency and because available materials do not readily withstand the high temperature at the pivoting joint between the diverging and converging sections of the engine exhaust nozzle. The use of movable vanes within the engine exhaust nozzle to obtain directional control and directional stability is unsatisfactory because of the lack of available materials to meet the high temperatures and gas erosion to which the vanes are exposed. Moreover, once solid propellant propulsion systems are fired, another disadvantage of such systems is that it is difficult to stop combustion within the rocket engine until the propellant charge is exhausted.

Although liquid propellant propulsion systems are not plagued with the problems of thrust, directional control, and directional stability found with solid propellant propulsion systems, liquid propellant propulsion systems also have inherent disadvantage. One of the disadvantages of liquid propellant propulsion systems is that liquid propellants cannot be stored in a propellant storage chamber for an extended period of time. This is because of the corrosiveness of liquid propellants, the low temperatures at which liquid propellants must be kept, and the chemical instability of liquid propellants. Thus time-consuming fueling operations are required immediately before a liquid propellant propulsion system is fired.

Another disadvantage of liquid propellant propulsion systems is that the fuels and oxidizers usually used as liquid propellants cannot be combined even for brief storage in the rocket prior to injection of the liquid propellants into the combustion chamber of the propulsion system. Thus, numerous pieces of equipment are required to combine fuels and oxidizers as they are used. This complicates liquid propellant propulsion systems and results in liquid propellant propulsion systems being less reliable, heavier, and more expensive than solid propellant propulsion systems.

The present propulsion system eliminates these and other problems associated with both solid propellant propulsion systems and liquid propellant propulsion systems. The present system uses a solid propellant produced in a form having liquid flow characteristics. The use of a propellant in this form causes the propulsion system of the invention to require only one propellant storage chamber for the propellant, and allows the propellant to be stored for extended periods of time in the propellant storage chamber of the system without deterioration of either the propellant or the chamber.

A fluid may be added to the propellant storage tank of the propulsion system immediately prior to firing as a source of additional thrust. The additional thrust is realized by adding a fluid having a high heat of combustion such as jet aircraft fuel of known type or liquid hydrogen. The oxygen required to oxidize the fluid is supplied by the excess oxygen in the solid propellant. A fluid added to the propellant storage tank immediately prior to firing the propulsion system of the invention also serves as a measure of additional safety since its discharge from the propellant storage tank after firing serves to prevent hot gases from seeping into the propellant storage tank from the combustion chamber and causing an explosion in the propellant storage chamber.

Since the quasi-liquid propellant of the propulsion system of the invention and added fluid may be transported by pumps, the engine for the propulsion system can be located remotely from the propellant storage tank. This allows the engine to be gimballed or valved for directional control and directional stability. Using pumps to transport the quasi-liquid propellant of the propulsion system allows combustion within the combustion chamber to be stopped and to be restarted again by merely activating a valve arrangement and a starting means in a proper sequence.

The present system comprises, generally, a solid quasi-liquid propellant formed by small spheres of solid propellant; a propellant storage tank for storing the quasi-liquid propellant; an engine having a manifold, an annular combustion chamber, an annular exhaust nozzle, and an annular control valve to regulate the flow of the quasi-liquid propellant into the combustion chamber; a centrifugal pump to transport the quasi-liquid propellant from the storage tank to the combustion chamber; and a turbine to drive the centrifugal pump.

Thrust is controlled by regulating the annular control valve so that propellant flow is increased or decreased while maintaining an evenly distributed propellant flow to all portions of the annular combustion chamber. Directional control or directional stability is achieved by regulating the annular control valve so as to distribute propellant flow unevenly about ther annular nozzle. A pressure take-off from the combustion chamber provides the necessary pressure to drive the turbine and a plurality of explosive cartridges provide the pressure to power the turbine for initial and subsequent starting of the propulsion system.

These and other features and advantages of the present invention will become more apparent from consideration of the following specification taken in conjunction with the accompanying drawings in which like characters of reference refer to corresponding parts throughout and in which:

FIG. 1 is a perspective view of the propulsion system disclosed herein.

FIG. 2 is a side elevation view of one of the propellant spheres of the propulsion system disclosed herein with a section of the sphere broken away to show the interior of the sphere.

FIG. 3 is a partial cross-sectional view of the system shown in FIG. 1 showing the pump rotor and the turbine used to drive the pump.

FIG. 4 is a partial cross-sectional view of the propulsion system shown in FIGS. 1 and 3 as seen along the line 4—4 in FIG. 3.

FIG. 5 is a partial perspective view of the vane used in the annular control valve shown in FIGS. 1 and 3.

FIG. 6 is a partial perspective view of a second embodiment of the annular control valve used in the rocket propulsion system disclosed herein.

FIG. 7 is a partial perspective view of the vane used in the second embodiment of the annular control valve shown in FIG. 6.

These figures and the following specification disclose a specific embodiment of the present invention but the details disclosed herein in no way limit the present invention since it may be embodied in other equivalent forms.

A sphere 15 of the propellant used in the rocket propulsion system disclosed herein is shown in FIG. 2. Each sphere 15 has a spherical core 16 consisting of a solid mono (−) propellant of known type such as a potassium perchlorate mixture and a thin metallic coating 18 bonded to and encasing the core 16. The core 16 is compressed into spherical shape by compressing means known in the art, and the metallic coating 18 consists of a metal such as aluminum having a comparatively low melting point and which is deposited upon the core 16 by a known process such as the vapor deposition process for metals.

The spheres 15 are of various small diameters such that a mixture of the spheres 15 exhibit flow characteristics similar to those of liquids having a low viscosity. Since a maximum amount of propellant is sought for a given space, the spheres 15 have a plurality of different diameters. Thus, the spheres 15 having smaller diameters fit in the spaces between the spheres 15 having larger diameters. The small diameters of the spheres 15 allow the spheres 15 to be pumped from one point to another similarly to a liquid so as to provide a quasi-liquid propellant as the fuel of the present propulsion system. It will be understood that the solid propellant may be in other particulate forms which permit it to be pumped or otherwise handled as if it were a liquid.

The structure of the present propulsion system in which the quasi-liquid propellant is used comprises a propellant storage tank 19; an engine 14 having a manifold 17, a combustion chamber 34, an exhaust nozzle 13, and a control valve 12; a pump 11 for transporting the solid propellant as spheres 15 or in other quasi-liquid form from the storage tank 19 to the combustion chamber 34; and a turbine 44 for driving the pump 11.

The storage tank 19 is a thin-walled cylinder and has a wall 20 which turns inwardly near the lowermost end of the tank 19 to form a funnel-shaped section 27. The funnel-shaped section 27 serves to reduce the diameter of the tank 19 to form a circular port 22a at the lowermost end of the tank 19. An annular flange 60 is integral with the wall 20 at its lowermost end and extends outwardly therefrom.

Fixedly attached to the annular flange 60 and extending downwardly therefrom is an upper housing 28 of the centrifugal pump 11. The upper housing 28 is bell-shaped and has at its uppermost or smallest diameter, a circular port 22 having a diameter equal to the diameter of the circular port 22a. The upper housing 28 is attached to the flange 60 so that the port 22 coincides with the port 22a by a flange 60' using bolts 105.

Rotatably mounted within the upper housing 28 and having a shape generally corresponding to the upper housing 28 is the pump rotor 21 of the pump 11. The pump rotor 21 is of known type having a centerline coinciding with the centerline of the storage tank 19. Holding the pump rotor 21 in position is a lower housing 30. The lower housing 30 is a thin, flat, circular disc having the same diameter as the lowermost end of the upper housing 28. The largest diameter of the pump rotor 21 is less than the largest diameter of the upper housing 28 and the lower housing 30.

The upper housing 28 and the lower housing 30 are spaced apart by spacers 27 integral with both the upper housing 28 and the lower housing 30 and positioned just outwardly of the outermost periphery of the pump rotor 21 and just inwardly of the outermost peripheries of the housings 28 and 30. The spacers 27 are equally distributed about the periphery of the pump rotor 21 and serve to space the upper housing 28 and lower housing 30 apart so as to define an annular outlet port 24 at the lowermost periphery of the pump 11.

Fixedly attached to the center of the lower housing 30 and extending downwardly therefrom is the turbine 44. The turbine 44 is an exhaust gas turbine of a type known in the art and has a turbine rotor 70 of known type driven by exhaust gases from the combustion chamber 34 as described below. A shaft 23 integral with the pump rotor 21 and extending downwardly therefrom through the lower housing 30 is fixedly connected to the turbine rotor 70 so that as the turbine rotor 70 rotates, the pump rotor 21 also rotates. The shaft 23 extends through a baseplate 65 of the turbine 44 and into a band brake 75 of known type fixedly attached to the baseplate 65. The band brake 75 serves to stop the shaft 23, the turbine rotor 70 and the pump rotor 21 from rotating when the band brake 75 is activated.

Since the propulsion system must have a means for powering the turbine for starting and restarting, a plurality of explosive cartridges 180 of known type are installed through the baseplate 65 of the turbine 44. The cartridges 180 are held in the baseplate 65 by a removable retaining ring 71 attached to the baseplate 65. A separation wall 69 immediately below the turbine rotor 70 separates the turbine rotor 70 from the cartridges 180. The separation wall 69 has a plurality of holes 68 therein with one of the holes 68 directly over each of the cartridges 180 so that the gases liberated when a cartridge 180 is fired will pass through a hole 68 in the separation wall 69, rotate the turbine rotor 70 and thereafter is discharged from the turbine 44. The manner in which the turbine operates after receiving the gases through the holes in the separation wall is conventional and well known in the art. The cartridges 180 are seleively fired using a known electrical firing means (not shown) and each cartridge 180 liberates enough energy when fired to rotate the turbine rotor 70 for a sufficient length of time for the propulsion system to start. The plurality of cartridges 180 permit the turbine rotor 70 to be rotated for a plurality of starts.

Encircling the outlet port 24 and extending outwardly therefrom perpendicular to the centerline of the pump 11 is the manifold 17 of the engine 14. The manifold 17 is formed by an upper annular plate 26 extending outwardly from the upper housing 28 of the pump 11 and a lower annular plate 29 extending outwardly from the lower housing 30 of the pump 11 approximately parallel to the upper annular plate 26. The upper annular plate 26 and the lower annular plate 29 are spaced apart by a plurality of inner spacers 31 and a plurality of outer spacers 31a so as to provide an annular passage 25 between the annular plates 26 and 29 continuous with the outlet port 24 of the pump 11. The inner spacers 31 are integral with the annular plates 26 and 29 and are equally distributed about a circle just outwardly of the innermost edges of the manifold 17. Onwardly of the inner spacers 31, the outer spacers 31a are integral with the annular plates 26 and 29 and are equally distributed within the manifold 17 about a circle. The manifold 17 is held in place by a retaining ring 10 fixedly attached to the lower housing 30 of the pump 11 and extending under the lower annular plate 29 of the manifold 17.

The upper annular plate 26 extends outwardly beyond the manifold 17 and thence downwardly and inwardly to form an annular recess 35. An insert 100 of ceramic heat resistant material of known type is placed within the recess 35 and forms a smooth inner surface 101 outwardly of and surrounding the manifold 17. Inwardly of the recess 35, the lower annular plate 29 curves downwardly and inwardly from the manifold 17 to form with the recess 35 the combustion chamber 34 of the engine 14 between the annular plates 26 and 29.

It will be understood when the operation of the propulsion system is described below that the quasi-liquid propellant impinges upon the inner surface 101 of the ceramic insert 100 and burns within the combustion chamber 34 and that the ceramic insert 100 provides a surface 101 to be eroded by the impinging or the combustion of the quasi-liquid propellant which is not essential to the structural integrity of the propulsion system. It will also be understood that the propulsion system disclosed herein provides a combustion chamber 34 in which a minimum of ceramic material is needed and in which no difficult bonding between ceramic material and metal is required since the recess 35 sufficiently holds the ceramic insert 100 in place.

An igniter 36 of known type such as a glow plug is fixedly inserted through the lower annular plate 29 so that the coil 37 of the igniter 36 extends upwardly into the annular passage 25 of the manifold 17 inwardly of the combustion chamber 34. In starting the propulsion system, the coil 37 is heated and when quasi-liquid propellant impinges upon the heated coil 37, the propellant is ignited so as to start combustion within the combustion chamber 34. Once combustion is initially started it is self-sustaining in known manner.

The lower annular plate 29 extends inwardly and downwardly from the combustion chamber 34 to form an annular inner wall 41 of the exhaust nozzle 13 of the engine 14. The upper annular plate 26 extends outwardly and downwardly from the combustion chamber 34 to form an annular outer wall 42 of the exhaust nozzle 13. Thus, beyond the combustion chamber 34, the annular plates 29 and 26 form respectively the walls 41 and 42 of an annular exhaust nozzle 13.

A bleed pipe 40 extends from the combustion chamber 34 through the lower annular plate 29 to the turbine 44. The bleed pipe 40 serves to pass exhaust gases from the combustion chamber 34 to the turbine 44 so as to provide the force necessary for rotation of the turbine rotor 70 of the turbine 44. Thus, the propulsion system is self-sustaining once combustion has started since the exhaust gases resulting from combustion of the quasi-liquid propellant drive the turbine 44, and the turbine 44 in turn drives the pump rotor 21 of the pump 11 to transport the propellant to the combustion chamber 34 for combustion.

The control valve 12 is positioned on the upper annular plate 26 and has a ring-shaped vane 45 extending through an annular slot 50 in the upper annular plate 26 into the annular passage 25 between the inner spacers 31 and the outer spacers 31a. The control valve 12 comprises the vane 45, a housing 46 for guiding the vane 45, and three hydraulic cylinders 62 for moving the vane 45 so as to open or close the annular passage 25.

The vane 45 has the shape of a segment of a thin-walled sphere lying between a first plane passing through the center of the sphere and a second plane passing through the sphere parallel to the first plane and spaced from it. Thus, the vane 45 has a larger diameter at its lower edge 80 than at its upper edge 81. The lower edge 80 of the vane 45 is chamfered inwardly to provide a tapered portion on the vane 45 at the lower edge 80.

The lower annular plate 29 has an annular groove 52 shaped to receive the lower edge 80 of the vane 45. The annular slot 50 in the upper annular plate 26 has a width sufficiently wide so that the inside edge 48 of the slot 50 is contiguous with the inside surface of the vane 45 when the lower edge 80 of the vane 45 is seated within the groove 52 in the lower annular plate 29, and the outside edge 47 of the slot 50 in the upper annular plate 26 has the same diameter as the largest diameter of the outer surface of the vane 45. Thus, the vane 45 prevents the flow of the quasi-liquid propellant of the system through the annular passage 25 of the manifold 17 when the vane 45 is seated in the groove 52 in the lower annular plate 29 and varies the flow of the quasi-liquid propellant as its position within the annular passage 25 is changed.

Fixedly attached to the upper annular plate 26 and extending upwardly from it on both sides of the slot 50 is the valve housing 46. The inside wall 56 of the valve housing 46 extends upwardly from adjacent the inside edge 48 of the slot 50 and is curved to form a surface contiguous with the inside surface of the vane 45. The outside wall 57 of the housing 46 extends perpendicularly upward from adjacent to the outer edge 47 of the slot 50. Fixedly attached to the uppermost edges of the walls 56 and 57 is an annular cover plate 58 which is parallel to the upper annular plate 26. Three radial slots 59 are uniformly distributed around the annular cover plate 58 and slidably receive piston rods 61 from the hydraulic cylinders 62.

Each of the three hydraulic cylinders 62 is positioned above the annular cover plate 58 directly over a slot 59 so that the piston rod 61 of each cylinder 62 extends through a slot 59. Support arms 64 extend upwardly from the annular cover plate 58 to opposite sides of each cylinder 62. The support arms 64 are fixedly attached to the annular cover plate 58 and are pivotally attached to opposite sides of each cylinder 62 so as to allow the cylinder 62 to pivot about an axis in a plane tangent to the surface of the vane 45. The vane 45 is pivotally attached to the extending ends of the piston rods 61 so as to allow the vane 45 and the piston rods 61 to pivot with respect to each other.

It will now be seen that as the piston rods 61 are extended and retracted into the cylinders 62, the vane 45 changes its position in the annular passage 25 of the manifold 17 so as to regulate the flow of the quasi-liquid propellant from the manifold 17 to the engine 14. If two piston rods 61 are retracted, the vane 45 tilts upward into the valve housing 46 about that point on the lower edge 80 of the vane 45 diametrically opposite the midpoint on the vane 45 between the two retracted piston rods 61. This tilting of the vane 45 allows more of the quasi-liquid propellant to flow under certain portions of the vane 45 than under other portions. Thus, by selectively retracting and extending the piston rods 61, the propellant flow through the annular passage 25 is varied to provide a variety of distributions of the quasi-liquid propellant or is stopped completely.

FIGS. 6 and 7 show a second embodiment for an annular control valve. The annular control valve 112 shown in FIGS. 6 and 7 has a vane 145 comprising a first segment 151, a second segment 152, a third segment 153, and a fourth segment 154. Each of the segments 151, 152, 153, and 154 are identical, and when positioned end to end, they resemble that segment of a thin-walled cylinder lying between two planes when the two planes are parallel to each other and perpendicular to the centerline of the cylinder. The segments 151, 152, 153, and 154 are placed end to end in the slot 50 in the upper annular plate 26 and form a continuous surface along the inside edge 48 of the slot 50.

Attached to a point midway along the upper edge of each of the segments 151, 152, 153, and 154 is the piston rod 61 of one of the hydraulic cylinders 62. The piston rods 61 of the hydraulic cylinders 62 serve to move the segments 151, 152, 153, and 154 within the annular passage 25 of the manifold 17 independently of each other and perpendicular to the upper annular plate 26. As the segments 151, 152, 153, and 154 are moved within the annular passage 25 the flow of the quasi-liquid propellant through the annular passage 25 is regulated as with the annular control valve 12.

The annular control valve 112 has a valve housing 146 which receives the vane 145. The valve housing 146 has an inside wall 156 extending perpendicularly upward from the upper annular plate 26 adjacent the inside edge 48 of the slot 50 and an outside wall 157 extending perpendicularly upward from the upper annular plate 26 adjacent the outside edge 47 of the slot 50. An annular cover plate 158 connects the walls 156 and 157.

The four hydraulic cylinders 62 are uniformly spaced about and fixedly attached to the annular cover plate 158. The piston rods 61 extend downwardly from the hydraulic cylinders 62 through holes 170 in the annular cover plate 158 and into the cavity formed by the annular cover plate 158 and the walls 156 and 157. The extending ends of the piston rods 61 are fixedly attached at the midpoints of the upper edges of the segments 151, 152, 153, and 154 as previously explained. This arrangement allows the segments 151, 152, 153, and 154 of the vane 145 to be independently movable within the valve housing 146 and the annular passage 25 of the manifold 17.

Operation

The propellant spheres 15 forming the quasi-liquid propellant are stored in the storage tank 19 when the propulsion system is prepared for firing. Since a solid propellant in a particulate form such as the propellant spheres 15 has the known characteristics of solid propellants, the period of storage may be of great duration without deterioration of the quasi-liquid propellant or the storage tank. During the storage period the annular vane 45 is seated within the annular groove 52 in the lower annular plate 29 and prevents the quasi-liquid propellant from flowing through the manifold 17 into the combustion chamber 34. The turbine 44 is not rotating the pump rotor 21 and the igniter 36 is not heating the coil 37.

When it is desired to fire the propulsion system, the igniter 36 is switched on to heat the coil 37 and the pump rotor 21 of the pump 11 is rotated as the vane 45 is being raised by the hydraulic cylinders 62 to open the annular passage 25. The pump rotor 21 is made to rotate by selectively firing one of the explosive catridges 46 so that gas pressure from the cartridge 46 drives the turbine rotor 70 which in turn rotates the pump rotor 21. Rotation of the pump rotor 21 and opening of the annular passage 25 causes the quasi-liquid propellant to be pumped from the storage tank 19 to the combustion chamber 34. As the quasi-liquid propellant is initially pumped to the combustion chamber 34, some of the propellant spheres 15 impinge upon the igniter coil 37 and ignite.

The ignition of some of the propellant spheres 15 by the igniter coil 37 causes all of the quasi-liquid propellant pumped to the combustion chamber 34 to ignite within the combustion chamber 34. The ignition of the quasi-liquid propellant in the combustion chamber 34 provides the initial thrust of the propulsion system as the resulting gases are discharged from the combustion chamber 34 through the annular exhaust nozzle 13. As this initial thrust is generated resulting from the rotation of the pump rotor 21 and the turbine rotor 70 by the firing of a cartridge 180, the gas pressure in the combustion chamber 34 forces gas through the bleed pipe 40 to the entrance end of the turbine 44 so as to continue rotation of the turbine rotor 70 and pump rotor 21 in a manner well known in the art. The continued rotation of the pump rotor 21 causes the pumping of the quasi-liquid propellant to continue and the propulsion system continues to operate until the quasi-liquid propellant is fully used or its flow is otherwise stopped.

Once the propulsion system is operating, the control valve 12 provides means for accurate control of a rocket. Raising and lowering all three piston rods 61 of the hydraulic cylinders 62 by equal amounts raises and lowers the vane 45 in the annular passage 25 and varies this amount of quasi-liquid propellant pumped to the combustion chamber 34. Thus, raising and lowering of the vane 45 to the same extent in all portions of the annular passage 25 serves to vary the thrust of the propulsion system while maintaining equal thrust around the entire circumference of the annular exhaust nozzle 13. It will be understood that any known suitable source of controlled hydraulic pressure (not shown) may be used to operate the hydraulic pistons 62 and that the piston rods 61 may also be moved by suitable pneumatic, electrical or other known means (not shown).

Directional control and directional stability are provided with the annular control valve 12 by tilting the vane 45 to vary the distribution of the quasi-liquid propellant to various portions of the annular combustion chamber 34. This results in a corresponding varying of the thrust around the circumference of the annular exhaust nozzle 13. It will be understood that increasing the thrust in one portion of the annular exhaust nozzle 13 and decreasing the thrust in the diametrically opposite portion of the annular exhaust nozzle 13 provides a turning thrust for directional control. It will also be understood that if the cylinders 62 are operated to tilt the vane 45 and to cause the highest point on the tilted vane 45 to move in sequence around the manifold 17, a vector of force at an angle to the centerline of the annular exhaust nozzle 13 and travelling around the circumference of the annular exhaust nozzle 13 is provided. This vector of force causes the annular exhaust nozzle 13 and a rocket powered by the propulsion system to rotate about the centerline of the annular exhaust nozzle 13 so as to provide directional stability.

As previously described above, the propulsion system of the invention may be provided with additional thrust and hot gases prevented from seeping back into the storage tank 19 from the combustion chamber 34 by adding a liquid propellant of known type to the storage tank. Since liquid propellants are customarily unstable and would erode the storage tank 19, the liquid propellant is added to the storage tank 19 just prior to firing. The metallic coating 18 on the propellant spheres 15 separates the spherical cores 16 of solid propellant from the liquid propellant and when the liquid propellant is used, the quasi-liquid propellant and liquid propellant are stored together during flight and pumped together from the single storage tank 19. Thus, the propulsion system of the invention not only provides variable thrust, directional control, and directional stability without complicated mechanical arrangements, but it also permits a fluid propellant to be combined with a solid propellant without separate storage areas in the propulsion system and without elaborate devices for combining the liquid propellant and the solid propellant prior to or in the combustion chamber 34.

To stop operation of the propulsion system once it is started as above described, the pump rotor 21 is stopped by the band brake 75 simultaneously with the closing of the annular passage 25 by the vane 45. This stops the pumping to the combustion chamber 34 of the quasi-liquid propellant and of any liquid propellant being used. Once the propulsion system is stopped and restarting is desired, the firing process is repeated using an unfired cartridge 180 to start the turbine rotor 70 which in turn powers the pump rotor 21.

When the second embodiment of the annular control valve 112 is used in the propulsion system, the propulsion system is started and stopped in the same manner as when the first embodiment is used. However, to achieve directional stability, opposite segments 151 and 153 are raised allowing more of the propellant to pass under these segments 151 and 153 than under segments 152 and 154. This produces two force vectors which are moved around the annular exhaust nozzle 13 by alternately raising and lowering sets of opposite segments 151 and 153 and 152 and 154 in proper sequence. These two moving vectors are similar to the single moving vector of force provided by the annular control valve 12 and the annular control valve 112 provides the same or greater directional stability than the annular control valve 12 at a slower speed of vector motion since the two diametrically opposite vectors of force preclude the possibility of putting a rocket into a tail spin which could result if a single vector moves too slowly around the circumference of the annular exhaust nozzle 13. Directional control is achieved by raising any one of the segments 151, 152, 153, or 154 more than the three remaining segments 151, 152, 153, or 154. Raising one of the segments 151, 152, 153 and 154 allows a greater flow rate of the propellant under the raised segments 151, 152, 153, or 154 and produces a force vector to turn the rocket from one flight path to another.

It will be obvious to those skilled in the art that many variations may be made in the embodiments chosen for the purpose of illustrating the present invention without departing from the scope thereof as defined by the appended claims.

What is claimed as my invention is:

1. In a rocket propulsion system having a combustion chamber, exhaust nozzle and propellant pump, a propellant comrising a plurality of solid particles wherein each particle is substantially spherical, said plurality of particles having the flow characteristics of a low viscosity liquid and the capability of being pumped as a liquid in the absence of a carrier fluid.

2. In a rocket propulsion system, an annular combustion chamber, an exhaust nozzle, a plurality of solid particles of propellant wherein each particle is substantially spherical, said plurality of particles having the flow characteristics of a low viscosity liquid and the capability of being pumped as a liquid in the absence of a carrier fluid, and means for selectively distributing said particles of propellant throughout the length of the annular combustion chamber.

3. The invention according to claim 1 wherein the solid particles of propellant are of varying diameters.

4. The invention according to claim 1 wherein a liquid propellant is admixed with the solid particles of propellant.

5. The invention according to claim 1 wherein each particle of propellant is encapsulated with a protective coating material which also serves as an aid to combustion.

6. A rocket propulsion system comprising a solid propellant formed into small spheres and having the characteristics of a low viscosity liquid; a tank member having said solid propellant therein; an engine having an annular manifold, an annular valve selectively insertable into the manifold, an annular member integral with and outwardly of said manifold and forming an annular combustion chamber, and an annular exhaust nozzle integral with and extending downwardly from the annular member; and pumping means for pumping the small spheres of solid propellant from the tank member to the combustion chamber through the manifold of the engine.

7. In a rocket propulsion system, an engine comprising an annular manifold defining an annular passage, an annular valve for selectively opening and closing the annular passage, said annular valve effective to selectively open one portion of said annular passage while simultaneously closing another portion of said annular passage, an annular combustion chamber continuous with and outwardly of the annular passage, a means for supplying a propellant through the annular passage to the annular combustion chamber, and an annular exhaust nozzle having its interior continuous with and extending downwardly from the annular combustion chamber.

8. A rocket propulsion system comprising a solid propellant formed into small spheres having different diameters and having a metallic covering encasing each of said spheres so as to make said spheres insoluble in a liquid propellant; an engine having an annular manifold defining an annular passage, an annular valve for selectively opening and closing selected portions of the annular passage, an annular combustion chamber continuous with and outwardly of the annular passage, and an annular exhaust nozzle having its interior continuous with and extending downwardly from the annular combustion chamber; pumping means for pumping the small spheres of solid propellant through the annular passage to the annular combustion chamber; and starting means for starting operation of the propulsion system by igniting the small spheres of solid propellant as they enter the combustion chamber.

9. In a rocket propulsion system, an engine comprising an annular manifold defining an outwardly extending annular passage and having an annular slot extending from said passage, a valve for controlling the flow of fuel through said passage having an annular vane insertable through said slot into said annular passage, a housing enclosing said vane above said manifold, means for guiding the insertion of said vane through said annular slot, and means for selectively inserting the vane through the annular slot into the annular passage so as to selectively open and close certain portions of said annular passage; an annular member outwardly of the manifold and having a combustion chamber continuous with an outwardly of the annular passage, a means for supplying a propellant through the annular passage to the annular combustion chamber, and an annular exhaust nozzle having an interior continuous with and extending downwardly from the combustion chamber.

10. A propulsion system for a rocket, said system comprising a quasi-liquid propellant, storage means for storing said propellant, a manifold concentric about a centerline and defining an annular passage extending outwardly from an inner circumference to an outer circumference in a direction substantially perpendicular to the said centerline, means for forming an annular combustion chamber continuous with the annular passage at its outer circumference and having an annular recess opposite the annular passage, an annular insert of ceramic material positioned within said annular recess, an annular exhaust nozzle having an interior continuous with the combustion chamber and extending in substantially the same direction as the centerline, a vane having a circumference concentric with the inner circumference of the annular passage and being adjustably insertable into the annular passage between the inner circumference and outer circumference of the annular passage, means for adjusting the position of the vane in the annular passage so as to vary the degree to which the vane is inserted into the annular passage, means for pumping the propellant from the storage means through the annular passage to the combustion chamber to the extent permitted by the position of the vane in the annular passage, and means for igniting the said propellant in the combustion chamber.

11. A rocket engine having a valve, a manifold defining an annular passage therethrough, a combustion chamber to which a propellant is fed through said passage, said manifold having a slot extending through it from the said passage, said valve comprising a gate insertable through said slot into said passage, and positioning means for selectively inserting and withdrawing the gate through the slot so that the gate is in any one of a plurality of positions within the passage to selectively open and close any portion of said passage to regulate the flow of fuel therethrough.

12. A valve for use on a rocket engine having an annular combustion chamber to which a propellant is fed through an annular passage in a manifold having an annular slot extending through it from the said annular passage, said valve comprising a ring-shaped vane insertable through said annular slot into said annular passage, a housing enclosing said vane above the said manifold, means for guiding the vane as the vane is inserted through the annular slot into the annular passage, and positioning means for selectively inserting and withdrawing the vane through the annular slot so that the vane is in any one of a plurality of positions within the annular passage.

13. A rocket engine having a valve, a manifold defining an annular passage, an annular combustion chamber to which a propellant is fed through said annular passage, an annular slot extending through said manifold from the annular passage, said valve comprising a plurality of arcuate vane segments insertable through the annular slot into the annular passage and which together close the annular passage when in a particular position; and positioning means for inserting and withdrawing the plurality of arcuate vane segments through the annular slot, said positioning means having a plurality of hydraulic cylinders positioned above the manifold with each of the plurality of hydraulic cylinders having the extending end of a piston rod attached to one of a plurality of arcuate vane segments, and means for selectively causing the plurality of hydraulic cylinders to move the vane segment to which its piston rod is attached within the annular slot.

References Cited
UNITED STATES PATENTS

| | | | |
|---|---|---|---|
| 1,059,509 | 4/1913 | Wheeler | 60—39.47 |
| 1,532,930 | 4/1925 | O'Neill | 60—39.47 |
| 2,396,566 | 3/1946 | Goddard. | |
| 2,596,435 | 5/1952 | Robert. | |
| 3,000,179 | 9/1961 | Samms | 60—35.6 |
| 3,066,486 | 12/1962 | Kirshner et al. | 60—39.47 X |
| 3,067,574 | 12/1962 | Corbett | 60—39.47 X |
| 3,070,469 | 12/1962 | Jenkin | 149—5 |
| 3,073,113 | 1/1963 | Faught | 60—35.6 |
| 3,107,485 | 10/1963 | Toulmin | 60—35.6 |
| 3,112,611 | 12/1963 | Adamson | 60—35.6 |
| 3,122,429 | 2/1964 | Toulmin | 149—5 |
| 3,126,704 | 3/1964 | Henderson et al. | 60—39.74 X |
| 3,127,739 | 4/1964 | Miller | 60—39.47 X |
| 3,130,672 | 4/1964 | Webb | 60—39.47 X |
| 3,142,152 | 7/1964 | Sessums | 60—39.47 X |
| 3,143,446 | 8/1964 | Berman | 149—5 |
| 3,144,751 | 8/1964 | Blackman et al. | 60—35.6 |
| 3,173,252 | 3/1965 | Ziegenhagen | 60—35.6 |
| 3,190,305 | 6/1965 | Schulze | 60—35.6 X |
| 3,214,906 | 11/1965 | Coleal | 60—35.6 |

CARLTON R. CROYLE, *Primary Examiner.*